United States Patent [19]
Schrier et al.

[11] Patent Number: 6,055,633
[45] Date of Patent: Apr. 25, 2000

[54] METHOD OF REPROGRAMMING MEMORIES IN FIELD DEVICES OVER A MULTIDROP NETWORK

[75] Inventors: Matthew R. Schrier, Bensalem; Mark E. Miller, Royersford, both of Pa.

[73] Assignee: Honeywell Inc., Minneapolis, Minn.

[21] Appl. No.: 08/962,938

[22] Filed: Oct. 28, 1997

[51] Int. Cl.$^7$ .................................................. G06F 13/00
[52] U.S. Cl. .................... 713/100; 711/170; 711/100; 709/221
[58] Field of Search ................... 709/222, 212, 709/224; 364/138; 370/322; 713/100; 702/122; 710/100; 714/25, 42; 395/500.17; 340/870.13; 711/170

[56] References Cited

U.S. PATENT DOCUMENTS

| | | | |
|---|---|---|---|
| 4,982,430 | 1/1991 | Frezza et al. . | |
| 5,068,778 | 11/1991 | Kosem et al. | 364/138 |
| 5,257,393 | 10/1993 | Miller | 709/224 |
| 5,270,705 | 12/1993 | Duffy | 340/870.13 |
| 5,467,286 | 11/1995 | Pyle et al. . | |
| 5,572,572 | 11/1996 | Kawan et al. . | |
| 5,720,031 | 2/1998 | Lindsay | 714/42 |
| 5,768,495 | 6/1998 | Campbell et al. | 714/25 |
| 5,793,987 | 8/1998 | Quackenbush et al. | 710/100 |
| 5,875,415 | 2/1999 | Lieb et al. | 702/122 |
| 5,878,217 | 3/1999 | Cherukuri | 709/212 |
| 5,887,165 | 3/1999 | Martel et al. | 713/100 |

FOREIGN PATENT DOCUMENTS

| | | |
|---|---|---|
| 0 319 820 A1 | 6/1989 | European Pat. Off. . |
| 2 178 627 A1 | 2/1987 | United Kingdom . |

OTHER PUBLICATIONS

International Search Report, Strobeck., Mar. 5, 1999.

*Primary Examiner*—John W. Cabeca
*Assistant Examiner*—Fred F. Tzeng
*Attorney, Agent, or Firm*—Robert J. Black; Anthony Miologos

[57] ABSTRACT

The method of downloading application information from a host device to a field device over a network providing communication and power to the field device, the method including the steps of stopping the normal data processing of a connected control device, halting operation of device components not critical to the download operation, reducing the operating frequency of a microprocessor included in the field device and transmitting a new device application over the network.

8 Claims, 1 Drawing Sheet

METHOD OF REPROGRAMMING MEMORIES IN FIELD DEVICES OVER A MULTIDROP NETWORK

BACKGROUND OF THE INVENTION

1. Field of the Invention

The present invention relates to the method of programming field devices, and more particularly to the reprogramming of field devices associated with a multidrop network of intelligent devices as utilized in the field of industrial control.

2. Background Art

In the past, it has been exceedingly difficult to reprogram memories associated with field devices as utilized in areas of industrial control. Among several solutions that have been utilized in the past, include the provision of a separate interface to the field device to be controlled, such as a serial port or similar access arrangement for downloading information. Such reprogramming typically takes place by removing the control device from the line. This solution frequently is inadequate inasmuch as it may require the operator to go to the field device in order to connect a downloading device, such as a personal computer. Obviously, this is very inconvenient and time consuming and subsequently the most expensive way of achieving the necessary reprogramming of a field device. Because of the location of many field devices, such technique is often impossible to utilize. Because of the nature of the remote devices, their location may be such that they are enclosed in housings outdoors which need to be opened to access the download connection. Such arrangements typically are undesirable because adverse weather conditions can wreak havoc with the delicate electronics utilized in such control devices.

It is also possible in some situations that the amount of current drawn while allowing full communication processing to take place during the time of the download would require substantial additional current handling capability resulting in substantial additional cost. To provide such current effectiveness would be a most expensive solution and place the device at a competitive disadvantage in the marketplace since comparable devices that do not include an online code download feature might be drawing less current. Accordingly, this download feature is not a requirement in the present invention.

Accordingly, it is the object of the present invention to permit the design of hardware flexible enough to permit current swapping, that is, to utilize the available current for normal operations, or instead, the same amount of current becomes available over the bus network to be utilized for reprogramming, instead of for process operation. Additionally, the use of the communication and power bus as a technique for the technology is different than has been utilized previously in the field of industrial control devices. Other features include software to control the processor speed depending on the functions being performed, thus resulting in the lower current requirements. Finally, it is yet another feature of the present invention to program memory of a low power field device while communicating online.

SUMMARY OF THE INVENTION

The present invention achieves the above objects and features by defining a method of operating a bus networking technology that defines a protocol for a multidrop, i.e., a single two-wire pair, network of intelligent devices for various industrial uses including process control. These devices can be categorized broadly as field devices and host devices. The field devices directly interface to the process being controlled, such as sensors or actuators. Examples of this type of control would be the use of pressure transmitters, temperature transmitters, valve controllers, etc. The control memory technology utilized in the field device stores the software for process control. Programming such devices requires a relatively significant amount of power. Accordingly, such devices are designed to derive a fixed amount of current from the network to which it is connected and therefore may not be permitted to draw more power during the programming cycle. Thus, the present invention maximizes the device's use of current draw during normal mode operation, that is the control operation, as opposed to the programming of the memory operation, while allowing the software to run only basic network communications during a download or reprogramming mode and thus maintain a constant power draw from the network. Accordingly, under the technique described for the present invention, should new software need to be downloaded to a field device, an operator would utilize a host device as the control device which has a greater capability than the field device. An operator than manually initiates a sequence of steps which will include sending a command to the field device that a download is about to begin.

In response to such download input signal received from the host device, the field device which does not have its own power source and draws only power from the network, would place itself in the proper state for downloading its current application and reprogramming of its memory. Such arrangements by the field device include stopping the normal data processing of the device, halting any other device components that are not critical to the download operation so that such components draw only a minimum of the power. This is followed by reduction of the operating frequency of the microprocessor that is operating communication software and providing an indication to the host device that download may begin. After such steps have taken place, the field device has extra power available for when the memory is erased or reprogrammed by the host device.

At this time, the hose device will transmit a new device application over the network. As each segment of the new application is received, the field device will store them in an area of its memory reserved for new applications or new programs. At some time, the field device may find it necessary to erase its memory before programming. This can be done during either of the steps described above, that is, the placing in the proper state to receive memory, or after being placed in the receive mode and extra power has become available in response to the host device transmitting the new application over the network.

After the application information has been received, the device will then return either a positive or negative response to the download received from the host device. If the response is positive, it will complete the download procedure by switching to the new application and then operating the associated control device based on the new information received.

BRIEF DESCRIPTION OF THE DRAWING

The present invention will be described in detail with reference to the accompanying drawing wherein.

DETAILED DESCRIPTION OF THE PREFERRED EMBODIMENT

Figure 1:
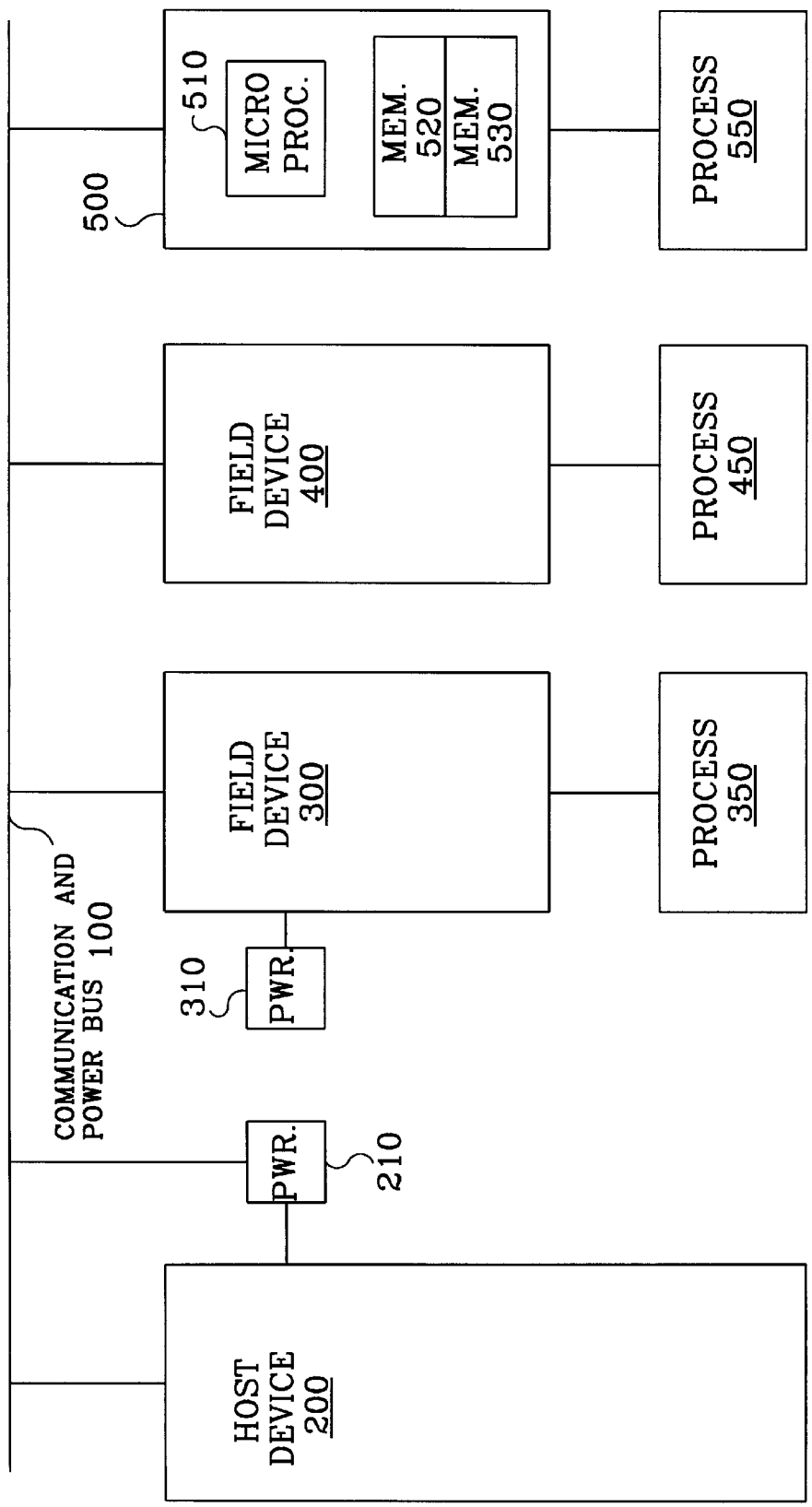
FIG. 1 is a block diagram of an industrial control network, including a host device and a number of field devices which in turn are utilized to provide control of various industrial equipment.

Referring now to FIG. 1, a multidrop, i.e., a single two-wire pair, network of intelligent devices for various industrial control uses, such as process control, is shown. The multidrop network 100 is shown as being connected to a host device 200. It should be understood that there may be more than one host device connected to the network. Host devices are typically configured as digital control system stations, and are usually attended by an operator or attendant. As shown, associated with host device 200 is a power source 210 which provides power to the host device 200 and also provides power via network 100 to the field devices which do not include a local power source. These would be field devices such as 400 and 500.

The field devices 300, 400 and 500 each have associated with them a process such as 350, 450 and 550, respectively, The form of the process is not necessary to be understood for the present invention, it only being required that control be provided by the associated field device.

Field device 300, for example, has associated with it a local power source 310, while field devices, as mentioned previously, 400 and 500 draw their power from power source 210 or similar one associated with a field device via the network 100.

Field device 500 includes a memory having an upper memory 520 and a lower memory 530. Typically speaking, such memory consisting of upper and lower half, each of 256 kilobytes, with a total memory size of approximately 512 kilobytes. Size is roughly double the size of a reasonably large application that might be expected for process control in a typical industrial control operation. The upper memory 520 is utilized to accept new application information during download operations. The lower memory 530 contains the normal, or currently running application. The design of field devices, such as 400 and 500, is such that current draw of the non-memory components can be reduced during downloading so that the memory will be able to draw the extra current it needs during the erase and programming cycles during any download from a host device such as 200.

It should be understood that the method that constitutes the heart of the present invention, which involves the method for reprogramming field devices, such as 400 and 500, by host device, such as 200, includes the following steps where initially a command is sent by the host device 200 to a field device, such as 500, indicating download is about to begin.

It should be understood that the details of the hardware and software of the present system do not form a part of the present invention, it only being required that they perform the functions as will be described herein to effect the process for reprogramming as taught in the present invention.

In response to receipt of the command that a download is about to begin from the host device 200 by a field device 500, the field device will place itself in the proper state for downloading an application and reprogramming of its memory. The sequence of operations includes terminating the normal data processing of the device back to a host device via bus 100. This is followed by halting the operation of other components that are not critical to a download operation, so that such components will draw only a minimum amount of power. At this time, the operating frequency of a microprocessor 510 included within field device 500 is reduced to operate the communications software. After these operations have been completed, an indication of them will be transmitted to the host device 200 via network 100 that field device 500 is ready to accept a download of information.

As the result of the foregoing steps, it is understood that the field device 500 now has extra power available via network 100. Extra power being available for erasing or programming of its internal memory.

Host device 200 now transmits a new device application over network 100 to field device 500. Field device 500 operates as segments of the new application are received to store them in an area of its memory 520 reserved for new applications. At some point, either before or after the receipt of the above-outlined step, the memory may have to be erased to provide adequate space for storage of the new program.

After the new application information has been received from host device 200 by field device 500 and stored in its memory 530, the device returns either a positive or negative response to the download. If the response is positive, and the information has been properly assimilated into the memory, it will complete the download procedure by switching to the new application and controlling its associated process 550 in accordance with the received information and is restarted at that particular time.

While but a single application of the present invention has been shown, it will be obvious to those skilled in the art that numerous modifications can be made without departing from the present invention, which shall be limited only by the scope of the claims appended hereto.

What is claimed is:

1. A method of downloading application information from a host device to a field device over a network providing communication and power to said field device, the method comprising the steps of:

a) the host device transmitting a command to the field device via said network that a download is about to begin;

b) said field device operated to place itself in a state to receive the downloaded information, in response to said command; and c) preparing an included memory for reprogramming, including the step of:
      halting operation of field device components not critical to the download operation whereby said field device components draw a minimum of power.

2. The method as claimed in claim 1, wherein step c) further includes the step of:

stopping the normal data processing of a connected control device.

3. The method as claimed in claim 1 wherein step c) further includes the additional step of:

reducing the operating frequency of a microprocessor included in said field device.

4. The method as claimed in claim 1 further comprising the step of:

indicating to said host device that download may begin, whereby said host device transmits a new device application over said network, and said field device is operated as segments of said new device application are received, storing in said included memory.

5. The method as claimed in claim 4, wherein said field device erases the memory in said field device before receipt of said new device application from said host device over said network.

6. The method as claimed in claim 4, wherein said field device erases the memory in said field device after receipt of said new device application from said host device over said netowrk.

7. The method as claimed in claim 4, further comprising the step of:

responding to said host device in response to receipt of said download.

8. The method as claimed in claim 4, further comprising the step of:

operataing said field device in response to said download procedure by switching to the new application, whereby said associated process is restarted.

\* \* \* \* \*